July 30, 1968 O. E. ALBERTSON 3,394,814
SEWAGE TREATMENT INCLUDING SLUDGE DISPOSAL THROUGH DIGESTION
Filed Jan. 7, 1966 3 Sheets-Sheet 1

INVENTOR.
ORRIS E. ALBERTSON
BY Theodore M. Jablon
ATTORNEY.

July 30, 1968   O. E. ALBERTSON   3,394,814
SEWAGE TREATMENT INCLUDING SLUDGE DISPOSAL THROUGH DIGESTION
Filed Jan. 7, 1966   3 Sheets-Sheet 3

INVENTOR.
ORRIS E. ALBERTSON
BY *Theodore M. Jablon*
ATTORNEY.

United States Patent Office 3,394,814
Patented July 30, 1968

3,394,814
SEWAGE TREATMENT INCLUDING SLUDGE DISPOSAL THROUGH DIGESTION
Orris E. Albertson, Norwalk, Conn., assignor to Dorr-Oliver Incorporated, Stamford, Conn., a corporation of Delaware
Filed Jan. 7, 1966, Ser. No. 519,244
14 Claims. (Cl. 210—195)

ABSTRACT OF THE DISCLOSURE

This invention is concerned with the disposal of digested sewage sludge or the like from a digester by subjecting the sludge to centrifugation in a solid bowl type centrifugal machine producing a disposable inert cake material. To protect the centrifuge against abrasion, the invention provides for grit removal in a closed degritting circuit wherein degritted digested sludge is recirculated at a high rate while grit-bearing raw sludge enters the circuit at a much smaller rate, and degritted digested sludge is delivered from this circuit to the centrifuge at said much smaller rate.

---

This invention relates to the purification treatment of polluted liquids such as domestic sewage, industrial wastes and the like, involving the destruction of the putrescible organic sewage matter through biological digestion. Digestion converts the putrescible matter into gas, while delivering substantially inoffensive digested sludge containing the indigestible residue, and releasing more or less of supernatant digester liquor depending upon the mode of digester operation. Raw sewage sludges supplied to the digester are the sludges resulting from various clarification or concentrating treatments of the raw sewage.

The invention is concerned with the disposal of the digested sludge by centrifuging in a manner whereby the sludge may be concentrated to a readily disposable cake material while centrifuge overflow liquor may be returned to the head end of the plant. Such concentrating of the dewatered sludge avoids or replaces drying beds or lagoons occupying large areas, and their maintenance, as well as the transportation of the sludge to these destinations.

In this connection, the invention is more particularly concerned with the problem of effectively removing the gritty matter from the suspended sewage solids where a solid bowl continuous conveyor type centrifuge is employed to concentrate the digested sludge to a readily disposable cake material. The installation, operation, and maintenance of such a unit is simple, with the added advantage that the unit can be readily relocated and transported. Such a unit will produce a cake of readily controllable moisture content efficiently in either continuous or intermittent operation. A unit having a desired excess capacity can be operated at intervals and thus be adapted to meet individual plant requirements. However, presence of grit in the digested sludge reaching the centrifuge should be prevented in order to avoid excessive abrasion in the interior of that machine. Indeed, such concentrations of grit as may occur in the sludge can increase maintenance costs of the centrifuges to a prohibitive point.

While grit removal facilities are not provided in many plants employing digestion systems, large grit chambers have been designed for settling grit from the influent raw sewage. Not only bulky and costly, these grit chambers also present problems of irregular grit removal due to wide fluctuations in the sewage flow therethrough. A thorough and positive grit removal including the smaller mesh sizes is thus difficult or impossible to attain. Also, the grit collected in these chambers must be scrubbed or washed free of adhering or intermixed raw sewage matter before allowing the grit to be released for disposal.

On the other hand, a problem is encountered when attempting to remove by forced separation or fractionation the gritty matter from raw sewage sludges. The problem then lies in the fact that these sludges, with proper overall plant operations, may have a total solids concentration and viscosity well in excess of that which is required for effective and positive grit removal, so that these raw sludges will not readily give up the grit by forced fractionation even in a cyclone device.

Thus, when grit-containing raw sewage sludges of greater than about 1% total solids concentration are encountered it was found to be impractical to attain a high degree of degritting of these raw sludges including those smaller mesh sizes in a cyclone. In fact, the separation of the grit was found to become increasingly difficult with increasing solids concentration. For example, at about 1% solids concentration nearly all of the +150 mesh grit particles were found to be removable, whereas for instance with a sludge of about 3% solids concentration substantially only the +100 mesh grit particles were removable. At 6% solids concentration the degritting operation became impractical or unmanageable.

To attain the objective of thorough and positive grit removal, the invention provides a cyclone device connected to the digester or storage tank, in such a manner that the grit is removed from digested sludge rather than from the raw sludges. The underflow or grit slurry from the cyclone may be subjected to a dewatering operation before releasing the separated grit for disposal.

In this way, the gritty matter including even the small mesh sizes are easily and positively removable because of the low viscosity of the digested sludge especially when hot, yet allowing the treatment plant as a whole to be operated at solids concentrations and at loadings such as dictated by plant efficiency requirements, and thus unaffected by the conditions for grit removal.

More particularly, the invention provides for operating the cyclone at optimum grit removal efficiency by way of recirculating digested sludge through the cyclone at a relatively high rate, preferably a multiple of the rate of feed of sludge entering and leaving the circuit and effective to purge the circuit of grit particularly of the finer mesh sizes thereof.

Grit carrying sludge delivered by the digester may enter this circuit while a corresponding volume of degritted digested sludge leaves the circuit mainly through the conveyor type centrifuge and to a minor extent as grit fraction underflow from the cyclone. The high recirculation rate tends to purge the circuit rapidly of gritty matter especially the finer mesh sizes, that may be carried by the cyclone overflow. For purposes of the invention, this circuit may be termed the rapid purging circuit. However, a suitable grit removal circuit, according to this invention, may also be established, wherein the cyclone operates in circuit with the digester, delivering substantially degritted overflow into the digester. This circuit tending to purge the digester of grit may be termed the slow-purging circuit because of the large detention volume of the digester, as differentiated from the aforementioned rapid purging circuit.

According to one feature, with the degritting and purging circuit established through the digester, raw sludge joins the circuit at the intake side of the cyclone delivering a largely degritted overflow into the digester at the aforementioned high recirculation rate, while a portion of digested sludge substantially free of grit leaves the circuit to pass into the conveyor type centrifuge.

According to another feature, with the degritting and purging circuit established through the digester, raw sludge feeds into the digester. Thus, only digested sludge recirculates to the cyclone, permitting effective grit removal from a sludge of minimum viscosity, while a minor portion of the degritted cyclone overflow volume is diverted into the conveyor type centrifuge.

Other and more specific features lie in structural implementations of the degritting circuit, and in the application of conditioning agents for attaining optimum degritting effects in the degritting circuit, and optimum separation in the centrifuge.

A preferred embodiment of the invention combines the aforementioned rapid-purging and slow-purging circuits in a manner whereby these circuits can be operated in alternation to meet varying grit purging requirements.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Field test work according to the invention has shown that it is not practicable to achieve appreciable degritting of raw sludges when sludges of greater than 1% total solids concentration are encountered. That is to say, the separation of the grit from the sludge becomes increasingly difficult with increasing concentration. For example, at 1% solids concentration the +150 mesh particles can still be separated from the sludge in a cyclone. But, when the sludge reaches 3% total solids concentration, only +100 mesh particles are removed. The effect of sludge concentration on the extent of grit separation attainable is exemplified in the following tabulation:

TABLE I.—RAW SLUDGE DEGRITTING

| Raw Sludge Concentration, Percent TS | Percent Removal | | | |
|---|---|---|---|---|
| | +50 mesh | +65 mesh | +100 mesh | +150 mesh |
| 1 | 100 | 100 | 100 | 90 |
| 2 | 100 | 100 | 100 | 70 |
| 3 | 100 | 100 | 90 | 45 |
| 4 | | | 55 | 30 |
| 5 | | | 35 | 15 |
| 6 | 37 | 24 | 15 | 6 |

But further test work showed that after the sludge had been digested, the grit may be removed by the cyclone from sludge concentrations much higher than those appearing in the foregoing tabulation. The following tabulation represents the degritting results attainable in the cyclone when handling digested sludge of +5% total solids concentration:

TABLE II.—DIGESTED SLUDGE DEGRITTING

| Digested Sludge Concentration, percent TS | Percent Removal | | | |
|---|---|---|---|---|
| | +50 mesh | +65 mesh | +100 mesh | +150 mesh |
| 5.0 | 100 | 99.7 | 99.4 | 97.7 |
| 5.2 | 100 | 98.5 | 98.5 | 97.9 |

The foregoing test data underlying the discovery in mind, the invention will be more clearly and readily understood as embodied in the flow sheets of FIG. 1 to FIG. 4 to be described as below.

Figure 5:
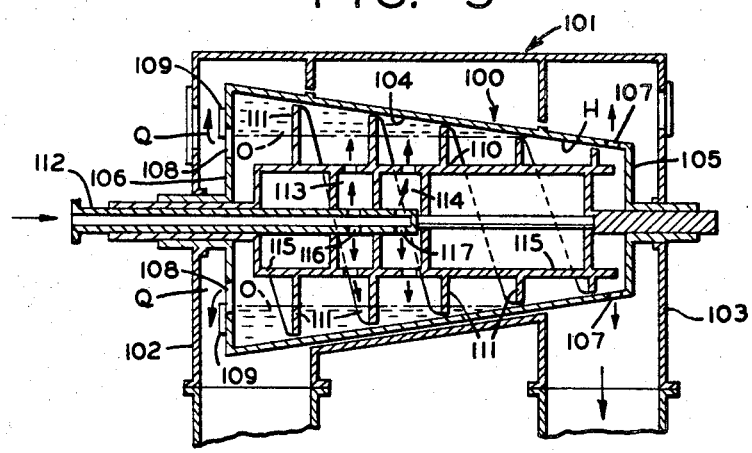
FIG. 5 is a semi-diagrammatic longitudinal sectional view of an example of the cake producing centrifuge.

But first follows a brief description of a solid bowl continuous conveyor type centrifuge herein employed for concentrating digested sludge to a desired cake consistency. According to the semi-diagrammatic example in FIG. 5, such a machine briefly termed a "solid bowl centrifuge," has a rotor structure 100 or bowl rotating in a housing 101 which may be sealed against the atmosphere. The housing has one discharge neck 102 located at the wide end of the rotor structure for delivering the centrifugally separated overflow liquid fraction discharging from the wide end of the rotor structure, and another discharge neck 103 at the narrow end of the rotor structure for delivery of separated solids or cake material discharging from the narrow end of the rotor structure.

The rotor structure 100 comprises a bowl which has a trunco-conically shaped body portion 104 provided with an end closure plate 105 at the narrow end and an end closure plate 106 at the opposite or wide end thereof. The separated solids or cake fraction representing the digested sludge discharges centrifugally from the bowl through openings 107 provided adjacent to the narrow end of the bowl. The opposite end closure plate 106 has overflow openings 108 associated with adjustable weir plates 109 determining the overflow level of the annular body O of liquid undergoing centrifugal separation in the bowl. Arrows Q at the wide end indicate delivery over these weir plates of the liquid overflow fraction.

Within the trunco-conically shaped rotor bowl of this machine there is rotatably mounted a conically shaped conveyor element 110 conforming to the inner contour of the bowl and adapted to be rotated at a differential speed relative to the rotation of the bowl, so that the spirally shaped flights 111 thereof will move the centrifugally separated solids comprising most of the digested solids out of the liquid body O to emergence onto the narrow end portion, the so-called beach portion H of the bowl, finally causing the material to discharge centrifugally through the openings 107 for disposal in the form of a relatively dry cake material delivered through neck 103.

The sludge from the digester enters this machine through an axially arranged stationary feed tube 112 introducing feed sludge, for example, into receiving chambers 113 and 114 formed in the hollow hub portion 115 of the flight conveyor element, and then through openings 116 and 117 into the annular liquid body O undergoing centrifugal separation in the bowl.

Figure 1:
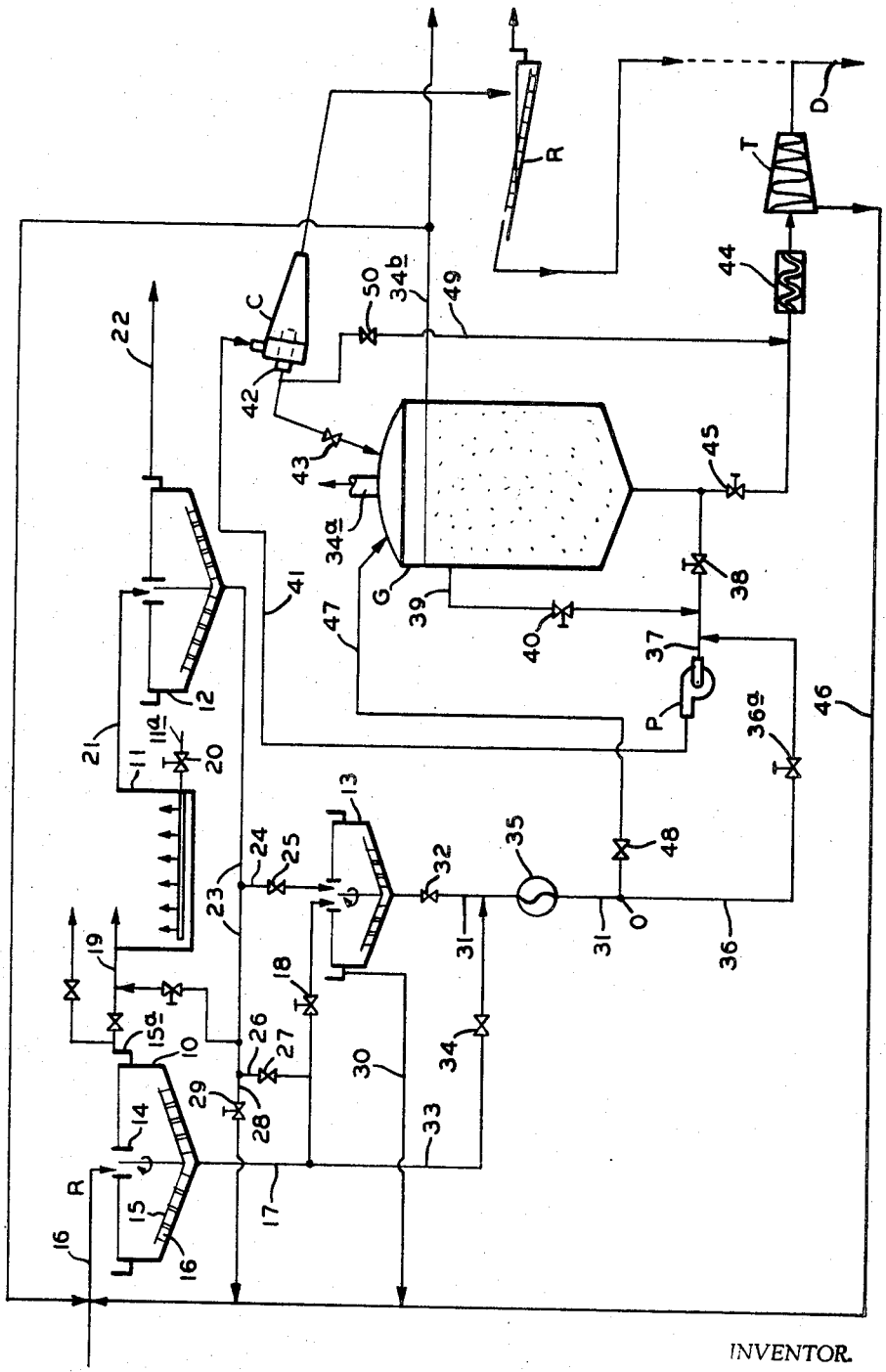
FIG. 1 is a flow sheet representing an example of a sewage treatment plant from initial clarification to final cake producing centrifuge, illustrating some forms of the novel degritting circuit with the digester included.

The flowsheet in FIG. 1 illustrates the invention in connection with a complete waste treatment system starting with the supply of raw sewage and ending with the delivery of a centrifugally concentrated readily disposable digested sludge of cake consistency.

According to the flowsheet exemplified in FIG. 1, the clarification treatment system comprises a primary clarifier tank 10, an aerobic treatment station 11, and a secondary clarifier tank 12 also called the final tank. The combined primary and secondary sludges constituting the underflows of the respective tanks may be sent to a thickener 13 producing a thickened sludge which may be subjected to digestion while overflowing liquor may be returned to the head end of the plant.

The primary tank 10 is operable in a well known continuous manner, comprising a feedwell 14, a rotary sludge raking structure 15, an effluent overflow launder 15a and an underflow discharge cone 16 at the bottom. The secondary clarifier tank 12, as well as the thickener 13 similarly may comprise a feedwell, a raking structure, an effluent launder, and a sludge discharge cone. The aerobic treatment station may be in the nature of an aeration tank provided with a pressure air supply 11a.

Either primary clarifier sludge alone or the combined primary and secondary underflow sludges are subjected to digestion, for instance in an aerobic digestion system such as indicated by a digester G. A degritting cyclone C operates to remove grit from digested sludge in the manner of this invention as will be furthermore described. A solid bowl continuous conveyor type centrifuge T concentrates degritted digested sludge, delivering the concentrate or cake material D while overflowing separated liquid returns to the head end of the plant. The grit slurry discharging as underflow from cyclone C is preferably dewatered, for instance in a cake classifier R.

Now describing the flowsheet of FIG. 1 in more detail, raw sewage is supplied by feed conduit 16 leading to the feedwell of the primary clarifier tank. A relatively dilute primary clarifier sludge discharges by way of underflow conduit 17 leading to the thickener 13 through a control valve 18. Primary effluent overflowing from clarifier tank 10 and carrying a suspension of non-settleable waste solids passes through a conduit 19 to the aerobic treatment station 11 shown to be an aeration tank in lieu of other possible forms of biological treatment apparatus, such for example as a so-called bio-filter. This aeration treatment produces a suspension of settleable biological floc structures passing from station 11 through a conduit 21 to the feedwell of the secondary clarifier tank 12. Secondary effluent overflowing from tank 12 and thus sufficiently purified by the preceding treatment operation is released from the treatment plant as indicated by effluent conduit 22, while secondary sludge comprising the settled biological floc structures passes from the tank through underflow conduit 23.

The secondary underflow conduit 23 has a first branch conduit 24 delivering into the thickener through control valve 25, a second branch conduit 26 with control valve 27 delivering into the primary underflow conduit 17 at a point upstream from control valve 18, and a third branch conduit 28 delivering through control valve 29 into the primary clarifier jointly with the raw sewage supply.

Effluent overflowing from thickener 13 may, through conduit 30, return to the head end of the plant, that is to the primary clarifier for re-treatment of the raw sewage, while thickened sludge is delivered through underflow conduit 31 via a control valve 32.

The primary underflow conduit 17 has a branch conduit 33 delivering through control valve 34 into the thickener underflow line 31 at a point downstream from the control valve 32. By manipulating the valves 18, 25, 27, 29, 32, and 34, a mixture of the primary and secondary underflow sludges may be sent to the thickener to produce a thickened mixed sludge for eventual delivery into the digester G, or the sludge mixture may be allowed to by-pass the thickener for eventual delivery into the digester through conduit 33. The digester has a gas outlet 34a, and it may have an overflow discharge conduit 34b.

The gritty material ranging from coarse to fines found in the raw sewage passes through the primary clarifier, to become entrapped in the relatively more viscous raw sludge mixture. Thus, grit will eventually reach the underflow conduit 31 either through the thickener 13 or by passing the same through conduit 33. An underflow sludge pump 35 will move such grit holding sludge from point O towards digester G either via conduit 36 and through control valve 36a, or via conduit 47 and through control valve 48. These two alternative courses or embodiments will be separately described below in connection with FIGURES 2 and 3 respectively.

According to the invention, the grit-containing raw sludge will enter a degritting circuit which comprises the digester itself, a circulating pump P, and a degritting cyclone C. Preferably, the capacity of the circulating pump P for maintaining the degritting circuit, as well as the capacity of the cyclone, are designed for handling a multiple of the sludge volume entering the circuit. The high recirculation rate (a) renders the degritting circuit independent of any variations in the raw sludge supply derived from the clarifiers; (b) allows the use of a cyclone large enough to preclude plugging or congestion therein; and (c) provides a cyclone operable at all times at optimum grit separating efficiency.

The grit-containing raw sludge from underflow line 31 is fed into the degritting circuit where it reaches the cyclone C only after substantially all the grit containing sludge has been digested. It is the relatively low viscosity of the digested sludge as determined by the field tests cited above, compared with viscosity of raw sludges, that makes economically possible the thorough removal of substantially all grit particles in the cyclone. This grit purging circuit delivers degritted digested sludge into the solid bowl conveyor type centrifuge T which concentrates the sludge to cake consistency, with the purging circuit continuously protecting the centrifuge against potential wear and tear from grit.

Figure 2:
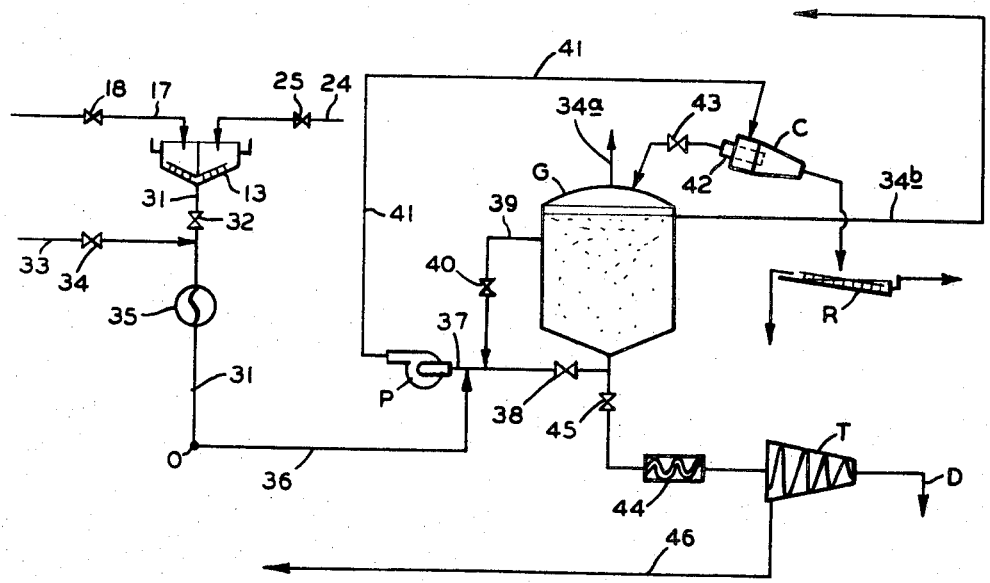
FIG. 2 is an enlarged portion of the flow sheet of FIG. 1, more clearly showing one form of the degritting circuit.

According to one embodiment of the invention, the degritting- or purging-circuit embodied in FIG. 1 and separately shown in detail in FIG. 2, comprises the digester G, the circulating pump P, and the cyclone C. The intake side of the pump has a conduit 37 connecting it with the bottom of the digester through a control valve 38. A parallel conduit 39 with control valve 40 leading from the upper portion of the digester joins conduit 37 at a point downstream from valve 38. By manipulating valves 38 and 40, a more dilute sludge may be drawn at least partially through conduit 39 from the upper strata of the digester contents for recirculation by pump P, further improving the grit separating effectiveness of cyclone C.

The discharge side of pump P has a conduit 41 connecting it with the inlet of cyclone C which has an apex finder or overflow outlet 42 for discharging degritted sludge into the digester through a control valve 43.

Raw sludge under pressure from pump 35 enters the degritting circuit through conduits 31 and 36 joining pump intake conduit 37 at a point downstream from valve 38. Thus, with pump P maintaining a high recirculation rate through the cyclone and through the digester, grit-containing raw sludge mixed with a much larger amount of digested sludge must first pass through the cyclone for degritting. At the same time, this high recirculation rate will also tend to purge the digester of grit that may have escaped through the cyclone overflow.

While the underflow metering pump 35 feeds grit-containing raw sludge into the above-described degritting circuit, and the pump P maintains the aforementioned high recirculation rate, a final metering pump 44 may draw digested sludge freed of grit from the circuit through a control valve 45, for delivery into the solid bowl centrifuge T to produce the concentrated cake material D with overflow liquid returning from the centrifuge through conduit 46 to join the raw sludge supply at the head of the plant.

The centrifuge T as well as the raw sludge pump 35 may be operated independently of the continued operation of pump P for maintaining the degritting and purging conduit at any desired rate of recirculation. Conversely, pump P and the degritting circuit ought not to be stopped while the raw sludge supply pump 35 is in operation.

Figure 3:
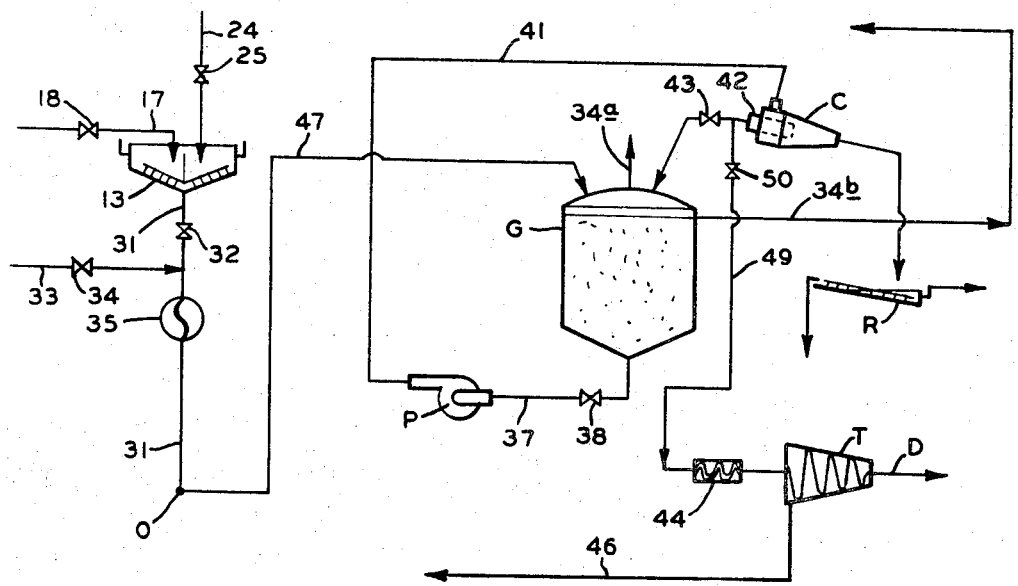
FIG. 3 is an enlarged portion of the flow sheet of FIG. 1, similar to FIG. 2, although showing another form of the degritting circuit.

Another mode of operating the degritting or purging circuit through the digester is also included in FIG. 1, and is separately shown in detail in FIG. 3. In that case, raw sludge from underflow conduit 31 is fed by pump 35 directly into the digester through a conduit 47. Again, pump P maintains the degritting circuit through conduits 37 and 47 and through digester G and through cyclone C as before, but with degritted sludge being withdrawn from the circuit directly at the overflow outlet of the cyclone, namely through a branch conduit 49 provided with control valve 50 for delivery through metering pump 44 into the solid bowl type centrifuge T. In this mode of operation, grit entering the circuit is removed by the cyclone after passing through the digester.

Figure 4:
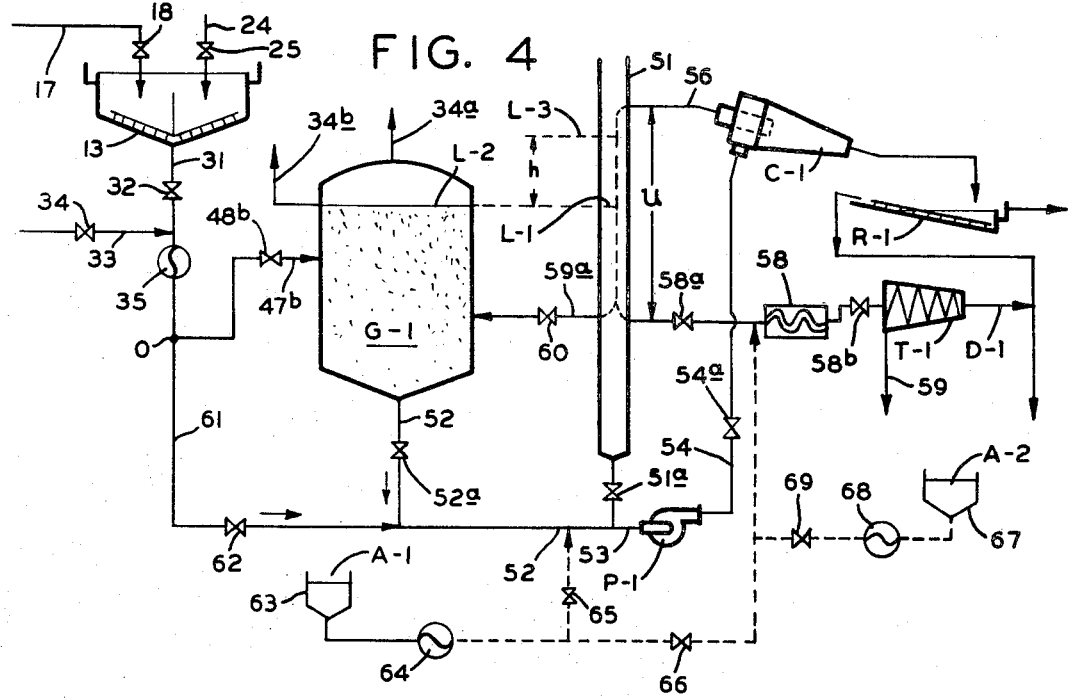
FIG. 4 shows another form of the degritting circuit with structural implementations whereby the circuit is operable either with or without including the digester in the circuit.

Another embodiment of the invention as seen in FIG. 4, provides one mode (A) of operation by the provision of a degritting circuit operating separate and subsequent to the digester. Such an arrangement allows the grit to enter the digester G–1 along with the raw sewage from pump 35 through conduit 47b, and to exit from the digester along with the digester sludge. The resulting grit-containing digested sludge is thereupon effectively degritted in the separate circuit delivering degritted digested sludge to the solid bowl centrifuge T–1 which, in turn, delivers a readily disposable concentrate of cake consistency.

In a preferred form as illustrated in FIG. 4, this separate degritting circuit comprises a standpipe 51 vented at the top, and having a normally open control valve 51a at the bottom. This standpipe preferably extends from a point substantially below the bottom of the digester G–1 to an elevation substantially above the sludge level in the digester. The lower end of the standpipe has a supply conduit 52 connecting it through a control valve 52a with the bottom of the digester, and a conduit 53 connecting with the inlet end of a circulating pump P–1. A conduit 54 leads from the delivery side of the pump through a control valve 54a to the inlet of a cyclone C–1 discharging its overflow through a conduit 56 into the upper end portion of standpipe 51. Underflow grit slurry from the cyclone discharges from the system preferably by way of a dewatering device, for instance, a rake classifier R–1. A second pump 58 located between valves 58a and 58b draws degritted digested sludge from the standpipe and thus from the circuit at a metered rate for delivery to the solid bowl continuous conveyor type centrifuge T–1 which, in turn, delivers a concentrate D–1 and an overflow liquid fraction 59 which may return to the head end of the treatment plant. With the circulating pump P–1 and the cyclone C–1 dimensioned and designed for maintaining a high recirculation rate as compared with the throughput pumping rate of discharge pump 58, a highly effective rapid degritting and grit-purging circuit is maintainable through the standpipe 51, independent of intermittent operation of pump 58 and of centrifuge T–1.

In this way, the operation of the degritting circuit is maintainable by only two pumps, namely pumps P–1 and 58, with pump P–1 having a recirculating capacity preferably a multiple of the throughput capacity of pump 58. When this circuit is in operation with valve 51a in the standpipe open and with pump 58 drawing degritted digested sludge, and the centrifuge T–1 delivering the concentrate D–1, the sludge level L–1 in the standpipe will be in balance with and substantially equal to the sludge level L–2 in the digester because of the communicating connection through conduit 52.

An alternative mode (B) of operation is available by the provision in FIG. 4 of means for optionally and at intervals including the digester G–1 in the degritting circuit, whereby the digester may be periodically purged of grit. For that purpose, a conduit 59a leads from the standpipe to the digester, through a control valve 60. Then, with valve 51a closed and valve 60 open, pump P–1 will move a circulating load through a degritting circuit which now includes the digester G–1, the cyclone C–1, and various conduit connections, namely conduits 52 and 53 leading from the digester to pump P–1, conduit 54 leading from the pump to the cyclone C–1, conduit 56 leading from the cyclone to the top end portion of standpipe 51, the upper portion U of the standpipe 51 itself, and finally conduit 59a leading from the standpipe to the digester. With this alternative circuit established through the digester, a sludge level in the standpipe may assume the elevation L–3 a distance $h$ above the previously indicated sludge level L–2, the super-elevation $h$ of L–3 being effective to cause sludge from the standpipe to transfer to the digester against whatever flow resistance may have to be overcome. This alternative circuit may be operated for grit-purging the digester irrespective of whether or not pump 35a and pump 58 with centrifuge T–1 are in operation.

A third mode (C) of operating the system of FIG. 4, which is alternative to modes (A) and (B), is made available by the provision in FIG. 4 of a pipe conduit 61 which by-passes the digester. This by-pass conduit leads from point O to join line 52 at a point downstream from valve 52a. With valve 47b closed and valve 62 open, the by-pass conduit 61 will allow pump 35 to feed grit-containing raw sludge to the circulating pump P–1 which in turn operates in such a manner as to draw a much larger volume of digested sludge from the digester and to mix it with the raw sludge and to deliver the mixture to cyclone C–1 where it is degritted and sent back into the digester. Thus cyclone C–1 will intercept a major portion of the grit in the raw sludge.

However, during this grit-intercepting phase the pump 58 should not be allowed to operate to feed the centrifuge unless the raw sludge supply from pump 35 is stopped, thus to prevent raw sludge after passing through the cyclone from entering centrifuge T–1 to find its way into the cake product D–1.

Residual fine grit may be removed from the digested sludge in a subsequent phase operating in the manner of mode (A) whereby digested sludge is recycled at a high rate through the cyclone and the standpipe 51 with valves 60 and 62 closed and valve 51a open.

The grit removal efficiency of the cyclone C–1 in the degritting circuit of FIG. 4 may be furthermore improved economically by the controlled addition of a dosing agent in solution capable of furthermore reducing the apparent viscosity of the sludge. Such a chemical or agent A–1 in a supply container 63 may be applied at a controlled rate indicated by a pump 64 and valve 65 into the circuit at the intake end of pump P–1 for effecting a thorough mixture with the sludge. A flocculating agent such as the one known as "Dow Anionic Polymer A–21" is well suited as a viscosity reducing agent under these conditions, since it is capable of effecting re-flocculation after the sludge has been subjected to the shearing forces of the pump and cyclone in the circuit. The viscosity-reducing effect of this and similar flocculating aids is due to their ability to cause the release of bound water from the sludge particles thereby densifying the same and qualifying them for improved separation. This additional anti-viscosity effect thus induced in the degritting circuit will subsequently also act to improve the clarification efficiency of the centrifuge T–1. For that purpose, a supplemental amount or balance of flocculating chemical may be added to the degritted sludge discharging from the circuit, preferably by introduction at the intake side of pump 58. This supplemental dosage for the centrifuge may come from container 63 through a control valve 66, or it may be in the form of another flocculating chemical A–2 in solution from a container 67 and applied at a controlled rate as indicated by a pump 68 and a valve 69. For this supplemental dosage from container 67 a flocculating compound such as the one known as the "Cationic Polymer Dow C–31" is adequate since it need not have the aforementioned re-flocculating property to provide the added clarification effects in the solid bowl centrifuge T–1.

While in the foregoing embodiments of the invention a single digester tank has been shown, this is nevertheless representative of a number of different digestion systems, in view of the main objective of the invention, which is to remove the grit effectively prior to the centrifuging operation. According to the foregoing embodiments such grit removal may be effected either in a separate degritting cycle receiving grit-containing digested sludge from the digester, or in a degritting cycle which includes the digester.

Where grit enters the digester, and agitation is provided in the digester as by gas-mixing or by mechanical agitation, such agitation would encourage the transit of grit through the digester for delivery to the cyclone. Imparting tangential movement to the body of digesting sludge in the digester would tend to cause a major portion of the grit to deposit at the center whence it is removable with relative ease.

In digesters having no provision for agitation a grit deposit may build up on the bottom until equilibrium is established, whereupon grit will discharge approximately at the rate at which it enters the digester.

As an example, a digestion system may be provided comprising a primary digester tank equipped for intensified agitation, and a secondary quiescent digester tank receiving the overflow from the primary tank and in turn delivering as underflow a digested sludge which may be returned to the primary digester tank. The primary digester tank may be part of the degritting cycle, or it may deliver grit-containing digested sludge to a separate degritting cycle, all as set forth in the foregoing embodiments.

In summary, it will be seen that this invention provides an improved and highly effective arrangement and method for preventing gritty matter originally contained in the sewage from entering the centrifuge T employed for concentrating digested sludge to cake consistency, featuring the recirculation of the digested sludge through a degritting cyclone at a rate significantly higher than the throughput rate.

It will be understood that each of the elements, or two or more together, of the apparatus herein described, may also find useful application in treatment systems differing from the type described above. Furthermore, while the invention has been illustrated and described as embodied in a treatment system employing a degritting cyclone operating in circuit, including the digester, or in a separate circuit subsequent to the digester, it is not intended to be limited to the details shown, since various modifications and structural changes may be made without departing from the spirit of the present invention.

I claim:

1. In a sewage treatment system for producing digested feed sludge from raw sludges, the apparatus which comprises in combination, a digester for raw sludge adapted to produce digested sludge having a viscosity substantially lower than said raw sludge; degritting cyclone apparatus adapted for handling a volume which is a multiple of the feed sludge volume; a solid bowl continuous conveyor type centrifuge for concentrating degritted digested sludge to cake consistency; conduit means for operating said cyclone apparatus in circuit with the digester whereby the cyclone apparatus overflow delivers degritted sludge into said digester and underflow grit slurry for disposal, said conduit means comprising a first transfer conduit for delivering the overflow from the cyclone apparatus to the digester, a second transfer conduit for delivering sludge from the digester to the cyclone apparatus, and a third conduit for delivering grit slurry from the cyclone apparatus to disposal; circulating pump means in said second transfer conduit, adapted for handling said multiple volume; controllable supply means for feeding raw sludge into said circuit; discharge conduit means operable for diverting degritted sludge from said circuit and delivering the degritted sludge to said centrifuge.

2. The apparatus according to claim 1, wherein said raw sludge supply means comprise means for feeding said raw sludge into said second transfer conduit at the inlet side of said cyclone apparatus, and wherein said discharge means comprise conduit means for passing said diverted degritted sludge from said digester to said centrifuge.

3. The apparatus according to claim 1, wherein said raw sludge supply means comprise conduit means for feeding raw sludge into the digester, and wherein said discharge conduit means comprise a transfer conduit for passing said diverted degritted sludge from the overflow delivered by the cyclone apparatus to said centrifuge.

4. The apparatus according to claim 1, wherein said discharge conduit means for diverting degritted sludge comprise a pump.

5. In a sewage treatment system for producing digested sludge from raw feed sludges, the apparatus which comprises a digester provided with inlet means for raw sludge, and with outlet means for digested sludge having a viscosity substantially lower than raw sludge; a solid bowl continuous conveyor type centrifuge for concentrating digested sludge to cake consistency; degritting cyclone apparatus adapted for handling a sludge volume which is a multiple of the feed sludge volume, said cyclone apparatus having feed inlet means for grit-carrying sludge, overflow outlet means for degritted sludge, and underflow outlet means for grit slurry going to disposal; return conduit means connected in circuit with said cyclone apparatus, for recirculating degritted overflow sludge from the cyclone apparatus overflow outlet means to the feed inlet means of the cyclone apparatus at a rate substantially corresponding to said multiple volume; a circulating pump in said circuit; transfer conduit means for passing digested sludge from said digester into said circuit; discharge conduit means operable for diverting from said circuit degritted sludge to one of said digester and said centrifuge.

6. The apparatus according to claim 5, wherein said discharge conduit means for diverting degritted sludge comprise a pump.

7. In a sewage treatment system for producing digested sludge from raw feed sludges, the apparatus which comprises a digester provided with inlet means for raw sludge, and with outlet means for digested sludge, a solid bowl continuous conveyor type centrifuge for concentrating digested sludge to cake consistency; a degritting cyclone apparatus adapted for handling a sludge volume which is a multiple of the feed sludge volume, said cyclone apparatus having feed inlet means for grit-carrying sludge, overflow outlet means for degritted sludge, and underflow outlet means for grit slurry going to disposal; circulating pump means for recirculating degritted overflow sludge to the feed inlet means of the cyclone apparatus at a rate substantially corresponding to said multiple volume; first conduit means connecting the delivery side of the pump with the feed inlet means of the cyclone apparatus; second conduit means connecting the intake side of the pump means to the overflow outlet means of the cyclone apparatus, thereby placing the cyclone apparatus in circuit with the pump means, third conduit means for feeding digested sludge from the digester into said second conduit means; fourth conduit means operable for diverting degritted digested sludge from said second conduit means to one of said digester and said centrifuge.

8. The apparatus according to claim 7, wherein said second conduit means comprise a standpipe, wherein a lower conduit connects the lower end of the standpipe with the intake end of the pump, and a higher conduit connects the upper end portion of the standpipe with the overflow outlet means of the cyclone apparatus, wherein said first conduit means is arranged to feed the digested sludge into said circuit at the lower end of said standpipe, and wherein said fourth conduit means is arranged for discharging degritted digested sludge from said standpipe at a point spaced upwardly from the lower end thereof.

9. The apparatus according to claim 8, wherein said standpipe is vented.

10. The apparatus according to claim 7, wherein said fourth conduit means for diverting degritted sludge comprise a pump.

11. In a sewage treatment system for producing digested sludge from raw feed sludges, the apparatus which comprises a digester provided with supply means for raw sludge and with outlet means for digested sludge having a viscosity substantially lower than raw sludge; degritting cyclone apparatus adapted for handling a volume which is a multiple of the feed sludge volume, said cyclone apparatus having feed inlet means for grit-bearing sludge, overflow outlet means for degritted sludge, and underflow outlet means for grit slurry going to disposal; a solid bowl continuous conveyor type centrifuge for concentrating the degritted digested sludge to cake consistency; a first conduit means for passing digested sludge from the digester to the inlet means of the cyclone apparatus; a circulating pump in said first conduit means, adapted for feeding said multiple sludge volume into the cyclone apparatus; a standpipe having its lower end connected to the first conduit means to communicate therewith at the intake side of the circulating pump; a second conduit means for delivering sludge from the overflow outlet means of the cyclone apparatus into said standpipe; a third conduit means providing communication from the standpipe to the digester so that sludge delivered into the standpipe may return into the digester; a fourth conduit means operable for diverting degritted sludge from said standpipe into said centrifuge; a first control valve operable to open or close communication between said standpipe and said first conduit, a second control valve operable to open or close communication between the standpipe and the digester through said third conduit, said first and second valves being operable with respect to each other so that the first valve is open when the second valve is closed, whereby the standpipe, the cyclone apparatus and the circulating pump are established in one degritting circuit, said valves also operable so that the first valve is closed when the second valve is open whereby the digester, the cyclone, and the circulating pump are established in another degritting circuit.

12. The apparatus according to claim 11, with the addition of a fifth conduit leading from said raw sludge supply means to join said first conduit means at the intake side of said circulating pump; a third control valve operable to shut off the raw sludge supply means to the digester; a fourth control valve for said fifth conduit operable to control the rate of supply of raw sludge into the degritting circuit, and a fifth control valve in said first conduit located at a point upstream from the juncture of said fifth conduit with said first conduit, said fourth valve together with said first and second valves being operable to establish a first operating phase for feeding raw sludge into a degritting circuit at a point downstream from the digester but with the digester included in the degritting circuit while the discharge of sludge from the standpipe into the centrifuge is interrupted, said first, second, and fourth valves also operable to establish a second operating phase in a degritting circuit having the digester excluded from the circuit.

13. In a sewage treatment system, the apparatus according to claim 11, wherein said standpipe is vented.

14. The apparatus according to claim 11, wherein said fourth conduit means for diverting degritted sludge comprise a pump.

References Cited
UNITED STATES PATENTS

| | | | |
|---|---|---|---|
| 1,999,973 | 4/1935 | Genter | 210—6 |
| 2,177,857 | 10/1939 | Bevan | 210—6 X |
| 2,209,613 | 7/1940 | Roeder | 210—6 X |
| 3,180,824 | 4/1965 | Corey | 210—195 X |
| 3,226,317 | 12/1965 | Albertson | 210—195 X |

REUBEN FRIEDMAN, *Primary Examiner.*

J. DE CESARE, *Assistant Examiner.*